US005768113A

United States Patent [19]
Safraoui

[11] Patent Number: 5,768,113
[45] Date of Patent: Jun. 16, 1998

[54] HIGH POWER AND HIGH VOLTAGE POWER SUPPLY INCLUDING A NON-RESONANT STEP-UP CIRCUIT

[75] Inventor: Georges Safraoui, Villejust, France

[73] Assignee: Eurofeedback, Evry, France

[21] Appl. No.: 741,356

[22] Filed: Oct. 29, 1996

[30] Foreign Application Priority Data

Oct. 31, 1995 [FR] France ................... 95 12853

[51] Int. Cl.$^6$ .................................. H02M 3/335
[52] U.S. Cl. ..................... 363/17; 363/132; 363/61
[58] Field of Search ................... 363/21, 16, 131, 363/97, 61, 17, 132

[56] References Cited

U.S. PATENT DOCUMENTS

| | | | |
|---|---|---|---|
| 3,745,440 | 7/1973 | Lord | 363/17 |
| 3,886,434 | 5/1975 | Schreiner | 363/68 |
| 4,540,967 | 9/1985 | Chitose | 336/84 C |
| 4,651,646 | 3/1987 | Foresman et al. | 102/208 |
| 4,754,385 | 6/1988 | McDade et al. | 363/16 |
| 4,890,210 | 12/1989 | Myers | 363/21 |
| 5,124,906 | 6/1992 | Kang | 363/21 |

FOREIGN PATENT DOCUMENTS

| | | |
|---|---|---|
| B-487 591 | 2/1975 | Australia. |
| 0 443 155 A1 | 8/1991 | European Pat. Off.. |
| 2 291 287 | 1/1996 | United Kingdom. |

OTHER PUBLICATIONS

Backman et al., "A new light-weight 100 A/48 V three-phase rectifier", Nov. 5, 1991, Proceedings of the International Telecommunications Energy Conf. (Intelec) Kyoto, Nov. 5–8, 1991, pp. 91–97, Institute of Electrical and Electronics Engineers.

O'Brien, "Support Equipment: Drawing a Bead on Power-Supply Reliability," Lasers & Optronics, Mar. 1991, pp. 49–50.

Phillips Corporation Product Information Sheet (BYM36 Series).

Harris Corporation Product Information Sheet (RHRD41205) File #3626 1993.

Dusan Skendzic, "Two transistor flyback converter design for EMI control" Aug. 21, 1990, Proceedings of the International Symposium on Electromagnetic Compatibility, Washington, Aug. 21–23, 1990, NR. –pp. 130–133, Institute of Electrical and Electronics Engineers.

Primary Examiner—Peter S. Wong
Assistant Examiner—Shawn Riley
Attorney, Agent, or Firm—Oliff & Berridge, PLC

[57] ABSTRACT

A high power and high voltage power supply is capable of charging one or more capacitors to high voltage. The power supply includes a current rectifier circuit for connecting to an AC source, a voltage step-up circuit including at least one controllable electronic switch and a voltage step-up transformer including a primary winding electrically connected to the electronic switch, and a control device for controlling the electronic switch. The power supply is organized to chop the current flowing through the primary winding in such a manner as to enable a high voltage to be taken from across the terminal to at least one secondary winding of the transformer. The step-up circuit is of a non-resonant type.

11 Claims, 3 Drawing Sheets

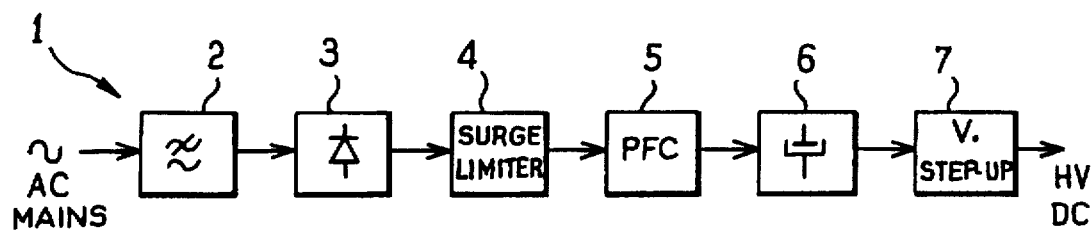
FIG. 1  STATE OF THE ART
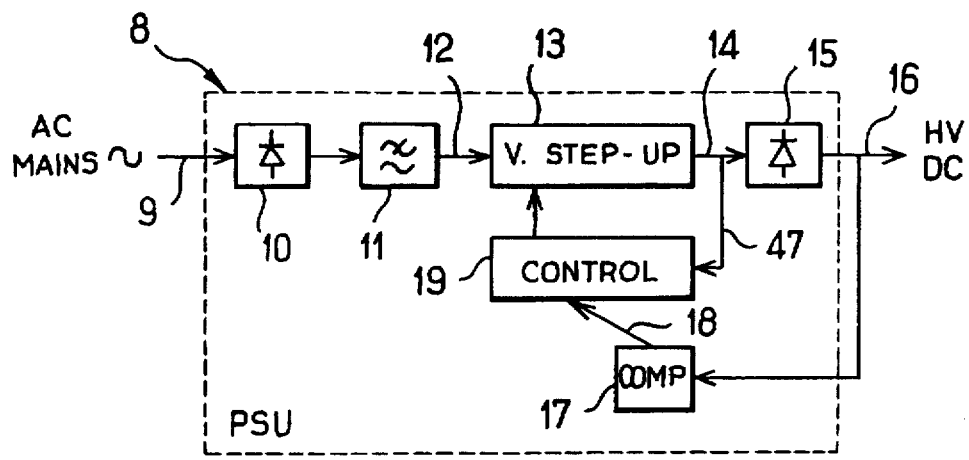
FIG. 2
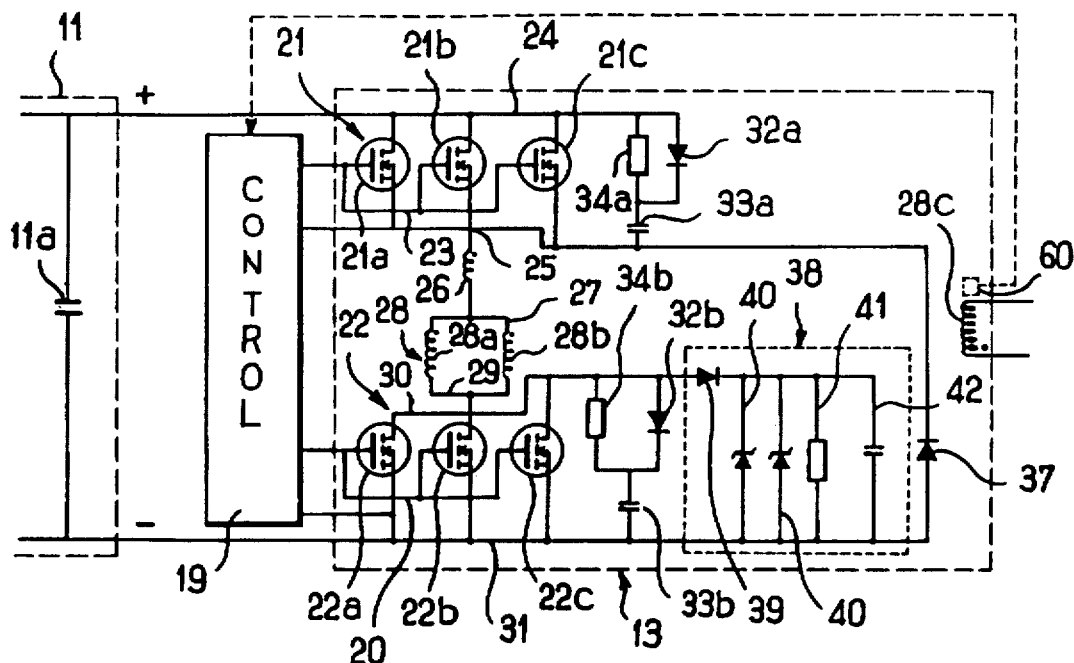
FIG. 3

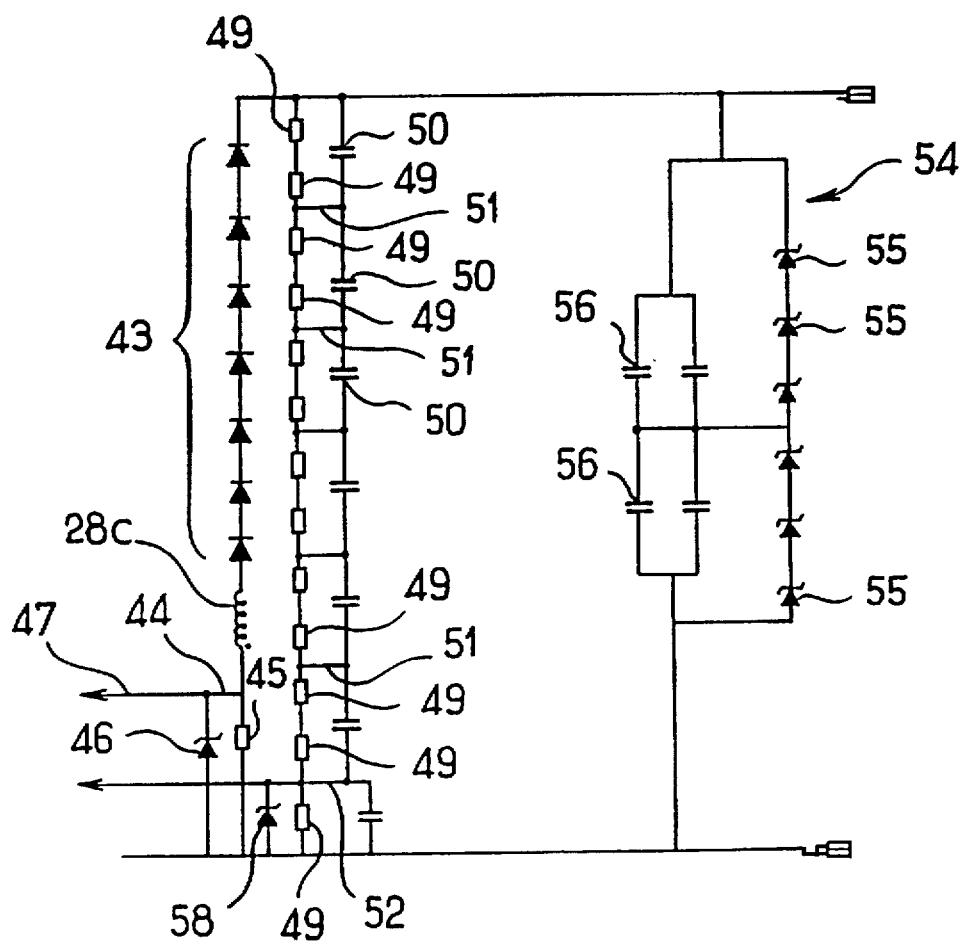
FIG_4
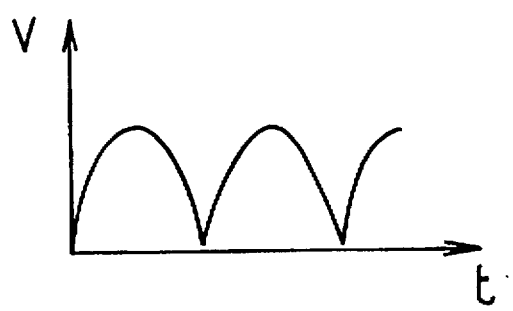
FIG_5

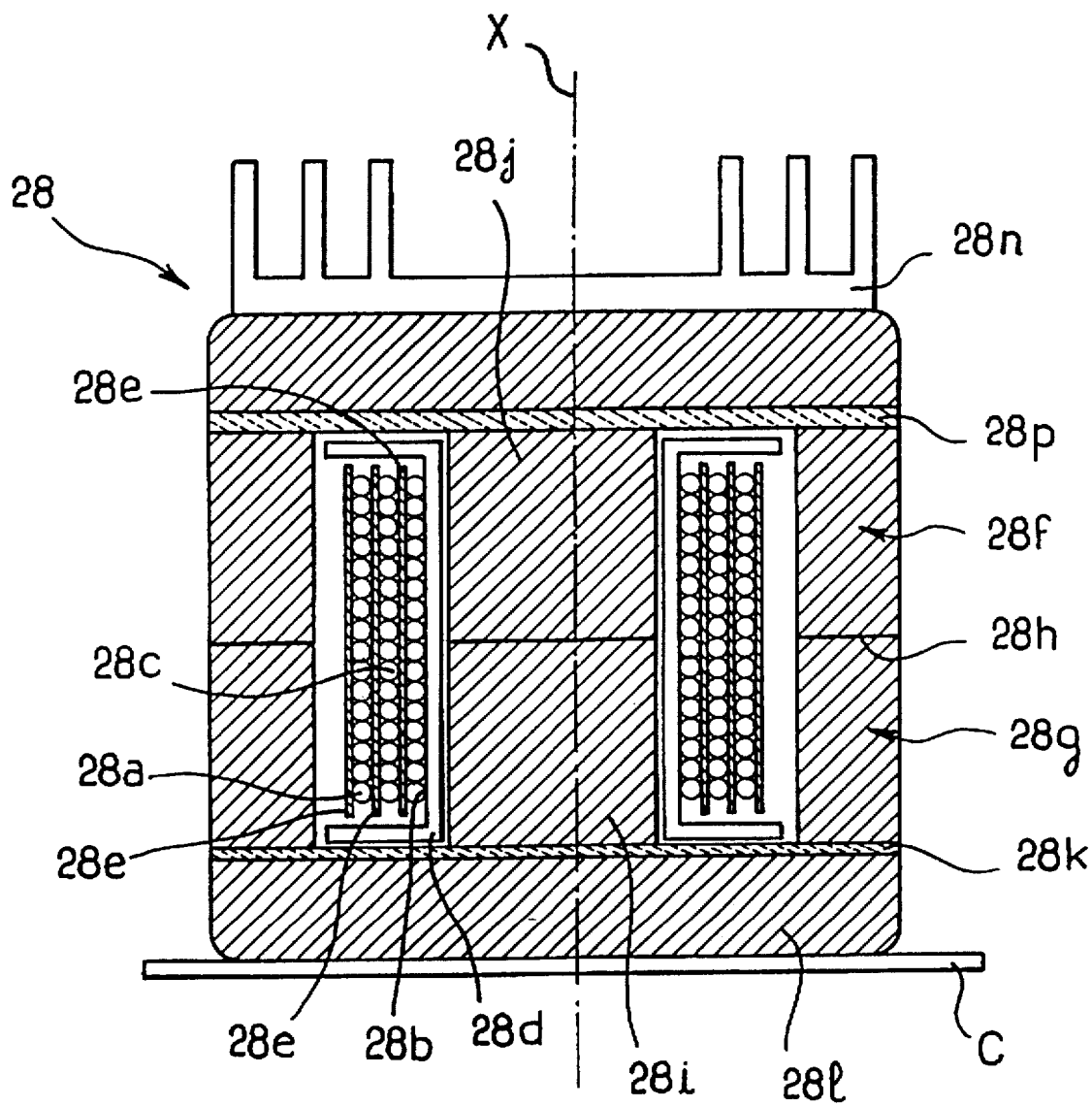
FIG_6

5,768,113

HIGH POWER AND HIGH VOLTAGE POWER SUPPLY INCLUDING A NON-RESONANT STEP-UP CIRCUIT

The present invention relates to the field of high power and high voltage power supplies intended, in particular, for quickly charging one or more capacitors with a high voltage.

FIELD OF THE INVENTION

More precisely, the invention relates to power supplies capable of taking low or medium voltage (typically alternating mains at 110 volts or 220 volts) and delivering therefrom a rectified voltage of at least several hundreds of volts (typically lying in the range 500 volts to 10.000 volts) at a power of several hundreds or thousands of watts (typically at a power greater than 800 watts). Such characteristics of output voltage and power are required for charging the capacitors used in certain lasers, for example, and for doing so quickly (typically in not more than a few seconds).

BACKGROUND OF THE INVENTION

Known high power and high voltage power supplies make use of a chopper voltage step-up circuit of the quasi-resonant type or of the resonant type, whose input is fed with filtered DC and whose output delivers a high voltage via a step-up transformer and controllable electronic switches, which high voltage is rectified to obtain the desired high voltage.

Step-up circuits of the quasi-resonant type and of the resonant type differ in the way in which the electronic switches are controlled. In resonant type step-up circuits, spontaneous switching of an electronic switch is induced by opposite controlled switching of another switch, and such circuits are generally symmetrical in terms of transformer excitation. In quasi-resonant type step-up circuits, spontaneous switching of a switch is induced by variation in the electrical magnitudes of the step-up circuit, and such circuits are generally asymmetrical in terms of transformer excitation. The common point shared both by quasi-resonant type and by resonant type step-up circuits lies in the leakage inductance of the step-up transformer, representative of incomplete coupling between the primary and secondary windings of the transformer, which leakage inductance is used to constitute all or part of the inductance in a resonant LC circuit.

The above-mentioned filtered and rectified DC used for powering the chopper step-up circuit of the quasi-resonant type or of the resonant type is obtained by means of a diode bridge and electrolytic filter capacitors of large capacitance (typically several thousands of microfarads). When they are in the uncharged state, such electrolytic capacitors behave like a short circuit, and it is necessary to provide a circuit that is capable of limiting the surge of current that is drawn when voltage is applied to the diode bridge.

Also, known high power and high voltage power supplies sometimes include a power factor correction (PFC) circuit upstream from the chopper step-up circuit of the quasi-resonant type or of the resonant type, to avoid polluting the AC mains to which the power supply is connected electromagnetically with harmonics of the input current.

FIG. 1 is a block diagram of a prior art high power and high voltage power supply 1. That power supply 1 comprises an input lowpass filter 2 followed by a diode bridge 3, a current surge limiter, a power factor correction (PFC) circuit 5, electrolytic filter capacitors 6, and a chopper voltage step-up circuit 7 of the quasi-resonant type or of the resonant type which delivers the desired high voltage via a step-up transformer.

Such a power supply 1 suffers from numerous drawbacks.

In particular, the use of high capacitance electrolytic capacitors 6 to filter the rectified voltage downstream from the diode bridge 3 and upstream from the step-up circuit 7 causes the cost, the weight, and the bulk of the power supply circuit 1 to be large. In addition, the average lifetime of electrolytic capacitors 6 is much shorter than that of the other electronic components used in the power supply 1, such that they constitute a limiting factor with respect to the lifetime of the power supply.

Also, standards concerning electromagnetic pollution of AC mains are becoming more severe, thereby making the power factor correction (PFC) circuits more complex and expensive.

OBJECTS AND SUMMARY OF THE INVENTION

A particular object of the present invention is to remedy the above drawbacks.

This is achieved by proposing a high power and high voltage power supply capable of charging one or more capacitors quickly to high voltage, the power supply comprising a current rectifier circuit for connecting to an AC source, a voltage step-up circuit including at least one controllable electronic switch and a voltage step-up transformer including a primary winding electrically connected to said electronic switch, and control means for controlling said electronic switch and organized to chop the current flowing through said primary winding in such a manner as to enable a high voltage to be taken from across the terminals of at least one secondary winding of said transformer, wherein said step-up circuit is of the non-resonant type.

In the invention, the energy associated with the leakage inductance is dissipated without it being necessary to integrate it in inductance forming a portion of a resonant circuit.

Unlike known high power and high voltage power supplies, a high power and high voltage power supply of the invention uses a step-up circuit of the non-resonant type, i.e. without an LC resonant circuit.

Preferably, the power supply includes at least two electronic switches and a free-wheel diode is associated with one of said electronic switches while a limiter circuit is associated with the other of said electronic switches, said limiter circuit being suitable for limiting voltage excursion across the terminals of the electronic switch with which it is associated.

In an advantageous embodiment of the invention, said limiter circuit is constituted by an RCD network.

The invention makes it possible to feed the step-up circuit with a non-filtered rectified voltage having ripple with an amplitude of at least 100 volts, and thus to avoid using high capacitance electrolytic capacitors for filtering. Under such circumstances, there is no longer any need to provide a surge current limiter. The power supply of the invention is also non-polluting in that it does not generate input current harmonics which would require the use of a power factor correction (PFC) filter. It is remarkable that these characteristics can be obtained in spite of the fact that the output voltage of the power supply varies from practically zero volts when beginning to charge the capacitor(s) to be charged, and reaches a high voltage at the end of charging said capacitor(s).

The primary and secondary windings of the step-up transformer are advantageously interleaved and the leakage inductance of the transformer is less than or equal to 10% of the self-inductance of the primary winding or of the secondary winding.

In a preferred embodiment of the invention, the secondary winding of the step-up transformer comprises a winding interleaved between two primary windings of said transformer which are electrically connected in parallel, and the magnetic circuit does not include any gap in the space inside the windings. The step-up transformer has one or more heat dissipator members stuck to the magnetic circuit material of the transformer. The step-up transformer include gaps situated outside the windings of the step-up transformer and preferably filled with a material that is electrically insulating but that conducts heat.

The invention also provides the use of a power supply as specified above for charging one or more capacitors.

BRIEF DESCRIPTION OF THE DRAWINGS

Other characteristics and advantages of the present invention appear on reading the following detailed description of a non-limiting embodiment of the invention, and from examining the accompanying drawings, in which:

FIG. 1, described above, illustrates the state of the art;

FIG. 2 is a block diagram of a power supply of the invention;

FIG. 3 is a circuit diagram of an embodiment of the step-up circuit used in a power supply of the invention;

FIG. 4 is a circuit diagram of an example of a high voltage rectifier circuit used at the output from the step-up circuit in a power supply of the invention;

FIG. 5 shows the appearance of the voltage applied to the input of the step-up circuit; and FIG. 6 is an axial section view through the step-up transformer.

MORE DETAILED DESCRIPTION

FIG. 2 is a block diagram of a power supply 8 of the invention. This power supply 8 is connected at 9 to domestic or industrial AC mains having a nominal voltage of 220 volts and a nominal frequency of 50 Hz. Naturally, without going beyond the ambit of the invention, it is possible to adapt the power supply 8 for connection to mains at 110 volts and 60 Hz, to three-phase mains at 380 volts, or to any other low or medium voltage mains supply.

The AC received at 9 is rectified at 10 in conventional manner by means of a diode bridge.

The rectified voltage is filtered at 11 to remove high frequency signals. In the embodiment described, high frequency filtering is performed after rectification. This high frequency filtering is advantageously performed by means of a plurality of capacitors 11a of the plastic film type having low capacitance (typically a few microfarads). In the example described, high frequency filtering is performed by means of six 1.5 microfarad capacitors connected in parallel.

In the invention, and unlike the prior art, it is not necessary to filter the fullwave-rectified voltage delivered by the diode bridge 10, so the rectified voltage obtained at 12 after high frequency filtering presents high amplitude ripple as a function of time, as shown in FIG. 5. As an indication, in the example described, the rectified voltage varies between 0 and 320 volts.

A voltage step-up circuit 13 comprising a step-up transformer is fed with the above-mentioned rectified voltage and it delivers a high voltage on an output 14 which is rectified at 15 to charge a capacitor (not shown) with high voltage at 16.

When the power supply is used to charge one or more capacitors and assuming the capacitor(s) to be completely discharged, the output voltage from the power supply rises from a value of nearly zero at the beginning of capacitor charging.

In the example described, the power supply 8 also includes means 17 for reading the output voltage at 16 and for comparing it with a reference value in order to deliver an error signal 18 to control means 19 organized to drive the step-up circuit 13 until its output voltage is equal to a predetermined voltage.

The control means 19 also receive a signal 47 representative of the current passing through the secondary winding of the step-up transformer. This signal can be obtained by measuring the voltage across the terminals of a resistor through which the current to be measured flows when the secondary comprises a single winding as shown in the figures. However, it is also possible for the power supply to have a secondary winding made up of a plurality of windings, each associated with a respective rectifier circuit. Under such circumstances, by connecting the rectifier circuits in series, it is possible to deliver a high voltage corresponding to the sum of the voltages delivered by each of the rectifier circuits. Then, i.e. when the step-up transformer has a plurality of secondary windings, it is preferable to measure the transformer magnetic flux associated with the current flowing through the secondary windings, since that makes it possible to use a single probe for all of the secondary windings. When the magnetic flux detected by the probe is zero, it is known that all of the secondary windings are carrying zero current. By way of example, a Hall effect sensor can be used as the probe.

FIG. 3 shows the step-up circuit 13 in greater detail.

This circuit comprises a first electronic switch 21 constituted in the example described by a parallel connection of three MOSFET transistors 21a, 21b, and 21c, and a second electronic switch 22 constituted by a parallel connection of three other MOSFET transistors 22a, 22b, and 22c.

The first electronic switch 21 is controllable by applying an appropriate electrical signal at 23 to the gates of the MOSFET transistors to allow current to pass between the positive rail 24 of the rectified current delivered downstream from the high frequency filter stage 11, and a terminal 25 of a winding 26. The other terminal of the winding 26 is connected to a first terminal 27 of the primary winding of a step-up transformer 28. The second electronic switch 22 is controlled by applying an appropriate electrical signal at 20 to the gates of the MOSFET transistors to enable current to pass between the negative rail 31 of the rectified voltage delivered downstream from the high frequency filter stage 11 and the second terminal 29 of the primary winding of the transformer 28.

A first damping and anti-interference circuit is associated with the first electronic switch 21. This circuit is constituted by a diode 32a having its anode connected to the positive rail 24 and its cathode connected to a terminal of a capacitor 33a. The other terminal of the capacitor 33a is connected to the terminal 25 of the above-mentioned winding 26. The diode 32a is connected in parallel with a resistor 34a. A second damping and anti-interference circuit identical to the first is associated with the second electronic switch 22. This circuit is connected between the terminals 30 and 31 of the second electronic switch 22 and comprises a diode 32b whose anode is connected to the terminal 30 of the second electronic switch 32 and whose cathode is connected to a terminal of a capacitor 33b. The other terminal of the capacitor 33b is connected to the negative rail 31. The diode 32b is connected in parallel with a resistor 34b.

A free-wheel diode 37 is associated with the first electronic switch 21. The diode 37 has its cathode connected to the terminal 25 of the winding 26 and its anode connected to the negative rail 31. This diode limits the maximum voltage across the switch 21 to the voltage obtained at 12.

A limiter network 38 is associated with the second electronic switch 22. This network is connected firstly to the terminal 30 of the second electronic switch 22 and secondly to the negative rail 31, and it serves to limit excursion of the voltage across the terminals of the second electronic switch 22 by dissipating the energy stored in the leakage inductance. In the example described, the network 38 is of the RCD type and comprises a diode 39 having its anode connected to the terminal 30 of the second electronic switch 22 and its cathode connected to a parallel connection of zener diodes 40, a resistor 41, and a capacitor 42. In the embodiment described, R=15 k$\Omega$ and C=0.47 $\mu$F.

The free-wheel diode 37 and the limiter 38 can be omitted when the electronic switches are of sufficiently high performance in terms of voltages they can withstand.

In the embodiment described, the primary winding of the transformer 28 is constituted by two windings 28a and 28b connected in parallel, while the secondary winding thereof is constituted by a single winding 28c which is connected, as shown in FIG. 4, at one end to a set of rectifying diodes 43 connected in series, and at its other end, at 44, to a resistor 45 and a zener diode 46 that are connected in parallel. The transformer 28 provides electrical isolation between the medium voltage portion and the high voltage portion of the power supply 8.

The resistor 45 serves to measure a voltage representative of the current passing through the winding 28c.

The output voltage of the power supply 8 is measured by means of a voltage divider comprising a plurality of resistors 49 connected in series and a set of capacitors 50 connected in series, each being connected in parallel with two consecutive resistors 49, with the exception of one of the capacitors 50 which is connected to one of the output rails of the power supply and in parallel with a resistor 49 and a zener diode 58. A voltage representative of the output voltage from the power supply 8 is measured across the terminals of this resistor and is taken from 52 for application to the control means 19.

A voltage limiter circuit 54 is disposed between the output rails of the power supply to avoid excessive voltage appearing in the absence of a load. The limiter circuit comprises a succession of zener diodes 55 connected in series and connected in parallel in groups of three with capacitors 56.

The person skilled in the art will recognize in the step-up circuit 13 a voltage converter circuit close to a flyback type circuit.

Nevertheless, unlike a conventional flyback type circuit, the electronic switch 22 is not associated, as is the electronic switch 21, with a free-wheel diode in a configuration of the asymmetrical half-bridge type, but is associated instead with the RCD network 38.

As mentioned above, the step-up circuit 13 uses a transformer 28 that comprises a primary winding constituted by two windings 28a and 28b electrically connected in parallel, and a secondary winding constituted by a single winding 28c interleaved between the two windings 28a and 28b of the primary. In the example described, both windings 28a and 28b have the same number of turns.

FIG. 6 shows the transformer 28 in section in a plane containing the axis of its windings 28a, 28b, and 28c.

The transformer 28 has a former 28d on which the windings 28a, 28b, and 28c are wound. The windings are separated by sheets 28e of electrically insulating material.

The magnetic circuit made of a ferrite type material is constituted by assembling together two blocks 28f and 28g, each of which is E-shaped in the section plane of FIG. 6. The branches of the E-shape are stuck together at their ends at 28h without leaving a gap, unlike conventional transformers in which the magnetic circuit is constituted by assembling together E-shaped blocks. The two central branches of the E-shapes, referenced 28i and 28j together constitute a magnetic core extending axially along the full length of the windings 28a, 28b, and 28c.

A gap-constituting plate 28k separates the three branches of the bottom block 28g from the base 28l thereof. A gap-constituting plate 28p separates the three branches of the top block from the remainder thereof, as shown in FIG. 6.

A finned heat sink 28n is stuck to the top face of the top block 28f.

In the example described, the plate 28p is constituted by two superposed sub-plates each having a thickness of 1 mm, and each made of ceramics, while the plate 28k is made of epoxy resin and is 1 mm thick.

The transformer 28 is designed to be mounted on a printed circuit board C by means of straps (not shown) bearing against the peripheries of the blocks 28f and 28g. The use of a plate 28k of epoxy resin to constitute the gap between the branches of the block 28g and the base 28l serves advantageously to reduce the mechanical stresses applied to the ceramics sub-plates constituting the top gap.

The electronic switches 21 and 22 are controlled to switch simultaneously by the control means 19 so as to establish or interrupt current flow through the primary windings 28a and 28b of the transformer 28. The above-mentioned winding 26 carries the current flowing through the entire primary winding of the transformer 28 and it is coupled to a winding (not shown) organized to enable the control means 29 to track changes in current flowing through the primary of the transformer 28 and to interrupt operation of the step-up circuit 13 in the event of a current surge.

The two electronic switches 21 and 22 chop the power supply current fed to the primary of the transformer 28 at a frequency that is about 30 kHz in the example described.

Advantageously, the switches 21 and 22 are controlled in saturation mode when the current in the secondary winding of the transformer 28 is at a zero crossing. This is known as "soft" switching. This type of switching serves advantageously to reduce the energy stresses to which the MOSFET transistors are subjected and therefore avoids premature aging thereof.

The secondary current is monitored for controlling soft switching of the electronic switches 21 and 22 by means of a signal picked up at 27. The person skilled in the art will observe that soft switching makes it possible, advantageously, to use rectifier diodes 43 that are moderately fast (i.e. that have a recovery time of about 150 ns), and that are therefore cheap.

It will be observed that using a resistor 45 for tracking the secondary current has the advantage of a substantially instantaneous response time, which is advantageous since the output voltage from the power supply is required to vary when the power supply is used for charging capacitors. In FIG. 3, dashed lines show a Hall effect sensor 60 that can be used as a replacement for the resistor 45 when there are a plurality of windings in the secondary.

The voltage across the terminals of the capacitor(s) to be charged varies relatively slowly compared with the period of the AC mains to which the power supply is connected. More precisely, in the example described, the time required to reach 90% of capacitor charge is greater than five times the period of AC mains.

The control means 19 receive at 18 a signal representative of the difference between the voltage across the terminals of the capacitor to be charged and a reference voltage programmed by the user. The control means 19 are organized to interrupt or slow down the switching cycles of the electronic switches 21 and 22 on coming close to or reaching the reference voltage.

Finally, the invention makes it possible to provide a power supply of weight, bulk, and cost that are reduced relative to those of prior art power supplies capable of delivering a mean power greater than or equal to 800 watts at a voltage greater than or equal to 500 volts.

Since a power supply of the invention is seen by the AC mains as a resistive load, a plurality of such power supplies can be connected in parallel so as to increase output power.

Naturally, various modifications can be applied to the embodiment described without going beyond the ambit of the present invention.

In particular, the MOSFET transistors can be replaced by other transistors suitable for switching, for example IGBT type transistors.

It is also possible to alter the step-up transformer 28, while nevertheless ensuring that the leakage inductance thereof remains small enough for the step-up circuit 13 to be operate properly, and preferably less than 10% of the self-inductance of each of the windings.

I claim:

1. A high power and high voltage power supply capable of charging one or more capacitors to high voltage, the power supply comprising a current rectifier circuit for connecting to an AC source, a voltage step-up circuit of the non-resonant type supplied with an unfiltered or poorly filtered rectified current, said step-up circuit including at least one controllable electronic switch and a voltage step-up transformer including a primary winding electrically connected to said electronic switch, and control means for controlling said electronic switch and organized to chop the current flowing through said primary winding in such a manner as to enable a high voltage to be taken from across the terminals of at least one secondary winding of said transformer, said power supply comprising a resistor or a magnetic flux probe for detecting the zero crossings of the current in said at least one secondary winding, said control means being organized to synchronize the switching of said electronic switch with the zero crossings of the current flowing through said at least one secondary winding.

2. A power supply according to claim 1, wherein the leakage inductance of said step-up transformer is less than or equal to 10% of the self-inductance of each of the windings.

3. A power supply according to claim 1, wherein said step-up transformer has a magnetic circuit of magnetic material and has heat dissipating members stuck to said magnetic circuit.

4. A power supply according to claim 1, wherein said step-up transformer includes gaps located outside the windings of the step-up transformer and preferably made of a material that conducts heat and that is electrically insulating.

5. A power supply according to claim 1, wherein the rectified voltage at the output from said rectifier circuit and upstream from the step-up circuit, includes ripple with an amplitude of at least 100 volts.

6. A power supply according to claim 1, wherein said step-up transformer includes a plurality of secondary windings and a magnetic flux probe for detecting the zero crossings of the current flowing through said secondary windings.

7. The use of a power supply as defined in claim 1, to charge one or more capacitors.

8. A power supply according to claim 1, wherein the primary of said transformer comprises two windings electrically connected in parallel.

9. A power supply according to claim 8, wherein the secondary of said transformer comprises a winding interleaved between said two primary windings.

10. A power supply according to claim 1, wherein said step-up circuit includes two controllable electronic switches electrically connected in series with said primary winding, a first one of the electronic switches being connected to the positive output rail from the rectifier circuit and to one terminal of said primary winding, and a second one of the electronic switches being connected to the other terminal of said primary winding and to the negative output rail of the rectifier circuit.

11. A power supply according to claim 10, wherein the step-up circuit includes a free-wheel diode associated with said first electronic switch and at least one limiter circuit associated with the second electronic switch, suitable for limiting the voltage excursion across the terminals of said electronic switch.

* * * * *